United States Patent
Roode

(10) Patent No.: US 10,441,934 B2
(45) Date of Patent: Oct. 15, 2019

(54) DEVICE FOR EFFICIENT MIXING OF LAMINAR, LOW-VELOCITY FLUIDS

(71) Applicant: The Boeing Company, Chicago, IL (US)

(72) Inventor: Matthew J. Roode, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 332 days.

(21) Appl. No.: 15/373,521

(22) Filed: Dec. 9, 2016

(65) Prior Publication Data
US 2018/0161738 A1  Jun. 14, 2018

(51) Int. Cl.
| | |
|---|---|
| *B01J 8/14* | (2006.01) |
| *B01F 5/00* | (2006.01) |
| *B01F 3/02* | (2006.01) |
| *C01B 32/162* | (2017.01) |
| *B01J 4/00* | (2006.01) |
| *B01J 8/00* | (2006.01) |
| *B01J 8/08* | (2006.01) |
| *B82Y 40/00* | (2011.01) |

(52) U.S. Cl.
CPC ............... *B01J 8/14* (2013.01); *B01F 3/02* (2013.01); *B01F 5/0082* (2013.01); *B01J 4/001* (2013.01); *B01J 4/005* (2013.01); *C01B 32/162* (2017.08); *B01F 2005/0017* (2013.01); *B01J 8/0015* (2013.01); *B01J 8/085* (2013.01); *B01J 2208/00318* (2013.01); *B01J 2208/00743* (2013.01); *B01J 2208/00752* (2013.01); *B01J 2208/00893* (2013.01); *B82Y 40/00* (2013.01); *C01B 2202/02* (2013.01); *Y10S 977/75* (2013.01); *Y10S 977/843* (2013.01)

(58) Field of Classification Search
CPC .... B01J 8/04; B01J 4/001; B01J 4/005; C01B 32/162; B01F 5/0082
USPC .......................................... 422/129
See application file for complete search history.

(56) References Cited

U.S. PATENT DOCUMENTS

| | | | |
|---|---|---|---|
| 6,761,870 B1 | 7/2004 | Smalley et al. | |
| 7,549,788 B2 * | 6/2009 | Fujiwara | B01F 5/0682 366/172.1 |

(Continued)

OTHER PUBLICATIONS

Nikolaev et al., "Gas-phase catalytic growth of single-walled carbon nanotubes from carbon monoxide", Chemical Physics Letters 313, 1999, pp. 91-97.

(Continued)

*Primary Examiner* — Huy Tram Nguyen
(74) *Attorney, Agent, or Firm* — MH2 TECHNOLOGY LAW GROUP LLP

(57) ABSTRACT

A gas delivery system and method for delivering reactants such as a first gas through a first conduit and a second gas through at least one second conduit, for example, through a plurality of second conduits. The plurality of second conduits may each have a length, wherein at least a portion of the length is entirely disposed within the first conduit. In an implementation, the first conduit may deliver carbon monoxide and the one or more second conduits may deliver carbon monoxide doped with a catalyst such as iron pentacarbonyl. The first and second gases may be introduced into a reaction vessel such as a reactor chamber and used to form carbon nanotubes.

20 Claims, 6 Drawing Sheets

(56) References Cited

U.S. PATENT DOCUMENTS

2013/0209347 A1    8/2013   Harris
2013/0309618 A1*  11/2013   Horn ...................... F23D 14/58
                                                    431/181

OTHER PUBLICATIONS

Nikolaev, "Gas-Phase Production of Single-Walled Carbon Nanotubes from Carbon Monoxide: A Review of the HiPco Process", J. Nanosci. Nanotech. 2004, vol. 4, No. 4, pp. 307-316.
Roode, "Low Reynolds Number Gaseous Mixing with Applications to Carbon Nanotube Production", Thesis, Feb. 9, 2016, 92 pages.

* cited by examiner

DEVICE FOR EFFICIENT MIXING OF LAMINAR, LOW-VELOCITY FLUIDS

TECHNICAL FIELD

The present teachings relate to the formation of a material such as a plurality of carbon nanotubes within a chamber of a reactor and, more particularly, to the introduction or delivery of two or more fluid reactants such as two or more reactant gases into the reactor chamber.

BACKGROUND

The utility of carbon nanotubes has been demonstrated in a wide range of industries such as aerospace, medicine, transportation, and many others. However, forming high-quality carbon nanotubes in large quantities, particularly single-walled carbon nanotubes, has proved difficult.

A new method and apparatus for forming carbon nanotubes, for example, high-quality single-walled carbon nanotubes in quantity, would be a welcome addition to the art.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A gas delivery system in accordance with an implementation of the present teachings includes a first conduit having a first end and a second end, wherein the first end of the first conduit is attached to a first gas source. This implementation further includes a second conduit having a first end and a second end, wherein the first end of the second conduit is attached to a second gas source, and the second conduit has a length and is positioned entirely within an interior of the first conduit over at least a portion of the length. The gas delivery system further includes a gas delivery port incorporating the second end of the first conduit and the second end of the second conduit. The gas delivery port is configured to deliver a first gas within the first gas source through the first conduit into a reactor chamber and a second gas within the second gas source through the second conduit to the reactor chamber.

The gas delivery system may further include a plurality of second conduits each having a length. The length of each second conduit may be positioned entirely within the interior of the first conduit over at least a portion of the length. The plurality of second conduits may be freestanding within the interior of the first conduit and free from physical contact with the first conduit over the portion of the second conduit lengths.

A first gas within the first gas source may include carbon monoxide, and a second gas within the second gas source may include carbon monoxide and an iron catalyst.

In an implementation, the second end of the first conduit defines a first orifice and the second ends of the plurality of second conduits define a plurality of second orifices, wherein the plurality of second orifices have a circular shape or an oval shape.

At least one of the interior of the first conduit and the interior of the second conduit can include at least one thread, channel, or rifling, or combinations thereof, where the thread, channel, or rifling is configured to impart a swirling motion to at least one of the first gas as it exits the first conduit and the second gas as it exits the second conduit.

The gas delivery system may include a plurality of second conduits, wherein the second end of the first conduit has a first diameter that delivers the first gas through the first conduit into the reactor chamber at a first velocity, the second end of each second conduit of the plurality of second conduits has a second diameter that delivers the second gas through each second conduit into the reactor chamber at a second velocity, and a ratio of the first velocity to the second velocity is from 0.1 to 1.1.

The gas delivery system may further include only one second conduit, wherein the second end of the first conduit has a first diameter that delivers the first gas through the first conduit into the reactor chamber at a first velocity, the second end of the second conduit has a second diameter that delivers the second gas through the second conduit into the reactor chamber at a second velocity, and a ratio of the first velocity to the second velocity is from 0.1 to 1.1.

In another implementation, a system for forming carbon nanotubes can include a first conduit configured to introduce carbon monoxide gas into a reaction vessel and a second conduit configured to introduce catalytic particles into the reaction vessel, wherein the second conduit has a length, and at least a portion of the length is disposed entirely within the first conduit.

The system may further include a plurality of second conduits configured to introduce the catalytic particles into the reaction vessel, wherein each second conduit of the plurality of second conduits has a length, and at least a portion of the length of each of the plurality of conduits is disposed entirely within the first conduit. Further, a thermal control device may be configured to maintain a thermal separation between the first conduit and the plurality of second conduits, wherein the thermal control device includes at least one of a thermal insulation and a thermal coil.

At least one of an interior of the first conduit and an interior of the second conduit may include at least one thread, channel, or rifling, or combinations thereof. The one thread, channel, or rifling may be configured to impart a swirling motion to at least one of a carbon monoxide gas as it exits the first conduit into the reaction vessel and catalytic particles as they exit the second conduit into the reaction vessel.

The first conduit may include a first end attached to a carbon monoxide source and a second end that delivers the carbon monoxide gas through the first conduit and into the reaction vessel. The second end of the first conduit may have a first diameter that delivers the carbon monoxide into the reaction vessel at a first velocity. The second conduit may include a first end attached to a catalytic particle source and a second end that delivers the catalytic particles into the reaction vessel, where the second end of each second conduit includes a second diameter that delivers the catalytic particles into the reaction vessel at a second velocity. A ratio of the first velocity to the second velocity may be from 0.1 to 1.1.

The system may further include a plurality of second conduits. The first conduit may include a first end attached to a carbon monoxide source and a second end that delivers the carbon monoxide gas through the first conduit and into the reaction vessel. The second end of the first conduit may have a first diameter that delivers the carbon monoxide into the reaction vessel at a first velocity. Each second conduit of the plurality of second conduits may include a first end attached to a catalytic particle source and a second end that delivers the catalytic particles into the reaction vessel. Each second end of the plurality of second conduits may include a second diameter that delivers the catalytic particles into the reaction vessel at a second velocity. A ratio of the first velocity to the second velocity is from 0.1 to 1.1.

In another implementation, a method for forming carbon nanotubes includes injecting a first gas into a first end of a first conduit, injecting a second gas into a first end of a second conduit and through an interior of the first conduit, and simultaneously transporting the first gas through the first conduit and the second gas through the second conduit to a fluid delivery port at a second end of the first conduit and a second end of the second conduit. The method further includes simultaneously introducing the first gas and the second gas through the fluid delivery port into a reactor chamber, mixing the first gas and the second gas together within the reactor chamber, and chemically reacting the first gas and the second gas within the reactor chamber.

The method may further include imparting a swirling motion to the second gas using at least one thread, channel, or rifling, or combinations thereof, in an interior of the second conduit as the second gas is introduced into the reactor chamber, and forming a plurality of carbon nanotubes during the chemically reacting of the first gas and the second gas within the reactor chamber.

The method may further include the use of a plurality of second conduits and injecting the second gas into a first end of each second conduit of the plurality of second conduits and through the interior of the first conduit, simultaneously transporting the first gas through the first conduit and the second gas through the plurality of second conduits to the fluid delivery port at a second end of the first conduit and a second end of each of the plurality of second conduits, and simultaneously introducing the second gas from the plurality of second conduits the reactor chamber.

The injecting of the first gas into the first end of the first conduit may inject carbon monoxide gas and the injecting of the second gas into the first end of each second conduit of the plurality of second conduits may inject an iron-doped carbon monoxide gas.

The method may further include introducing the first gas through the fluid delivery port and into the reactor chamber at a first velocity and introducing the second gas through the fluid delivery port and into the reactor chamber at a second velocity, wherein a ratio of the first velocity to the second velocity is from 0.1 to 1.1.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
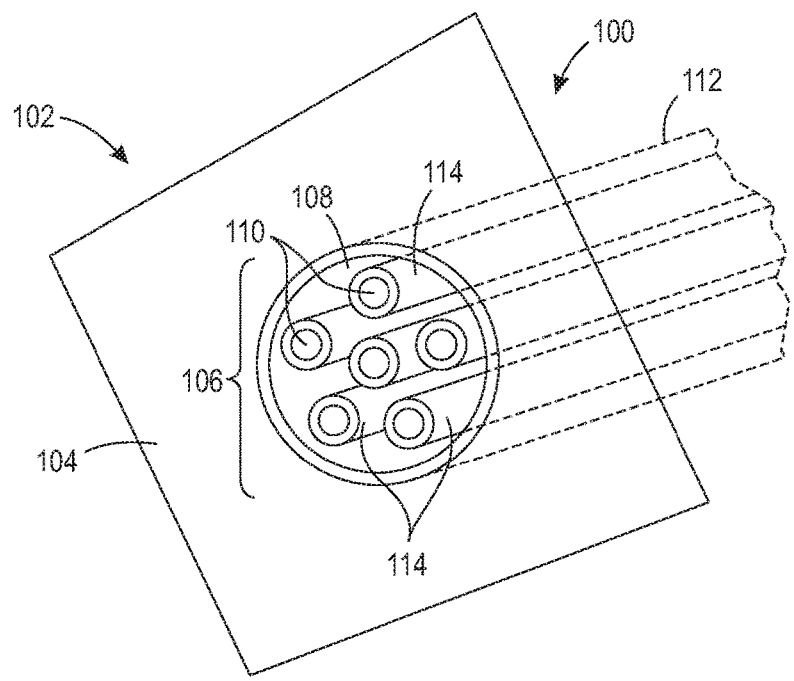
FIG. 1 is a perspective depiction of a gas delivery port for delivering gases into a reaction vessel in accordance with an implementation of the present teachings.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever possible, the same reference numbers will be used throughout the drawings to refer to the same or like parts.

Carbon nanotubes (CNTs), particularly high-purity, single-walled (SWCNTs) nanotubes, show great promise for the development of advanced materials. Mechanically, CNTs have high tensile elastic moduli and a demonstrated ability to improve material stiffness, strength, toughness, or vibrational damping resulting in a variety of applications. Electrically, CNTs have been shown to improve electrical conductivity and current density-functionalities and are increasingly used within electronic components and component packaging. CNTs have been shown to possess very high thermal conductivities, leading to applications as thermal interface materials and micro-scale heat exchange devices. Within the biotechnology sector, CNTs are being studied for a wide variety of applications from drug delivery to medical devices due to the chemical compatibility of CNTs with biological molecules. Often the benefits are chirality-dependent, and this remains an active area of research.

The presence of inclusions or other structural defects within the lattice structure of the CNT may significantly decrease the benefits that this nano-composite offers. The drive toward harnessing the potential of this nanotechnology intersects with the manufacturability of suitable, plentiful CNTs.

One of the most common CNT production methods today is chemical vapor deposition (CVD). This process is well-suited for large scale applications, though multi-walled carbon nanotubes (MWCNTs) are the cheaper and more common form created. Unfortunately, compared to SWCNTs, MWCNTs are more prone to impurities or defects, thereby resulting in a significant disparity between actual and predicted performance of the CVT-impregnated device regardless of application. The production of higher-purity SWCNTs is feasible with the CVD process, but both the monetary and temporal costs increase significantly over a comparably sized batch of MWCNTs.

An alternative to CVD-based SWCNT production is the High Pressure Carbon Monoxide (HiPCO) process. Though the HiPCO process shows promise in formation of SWCNTs, scaling up this process to form high-quality materials in low-cost quantities suitable for an industrial production environment has proved difficult. The HiPCO process includes the use of the exothermic Boudouard reaction, given by the equation:

$$CO_{(g)} + CO_{(g+Fe\ Catalyst)} \rightarrow CO_{2(g)} + C_{(solid)}$$

At the proper pressure and temperature and in the presence of an iron catalyst, two parts of carbon monoxide react to yield one part carbon dioxide and one part solid carbon. Provided the temperature of the mixed reactants is at least 500° C., the solid carbon will form SWCNTs atop each iron cluster. Typically, laboratory-scale reactor operating pressures are between 5 and 100 atmospheres, operating temperatures of the gas mixture is at least 800° C. and the total operating flow rate is approximately 5 liters per minute (L/min), leading to gas velocities on the order of centimeters per second. This slow gas velocity is necessary to achieve the residence time for sufficient SWCNT growth to occur before the constituents reach the reactor outlet.

To achieve these conditions and deliver the iron catalyst, two separate streams of inlet gas are delivered into the entrance region of the reactor and are combined via a free shear flow inside the reactor chamber within the mixing region. The boundary between mixing region and growth region is defined to be the point whereby the two separate gas streams have combined into one uniform flow at a temperature sufficient to support the formation of SWCNTs. Gas stream 1 is pure CO at a temperature of 1200° C. Gas stream 2 is a mixture dominated by CO but with trace concentrations of dispersed iron in the form of iron pentacarbonyl ($Fe(CO)_5$), all at a temperature between 25° C. and 200° C. The $Fe(CO)_5$ will decompose into free iron and five CO molecules once its temperature reaches or exceeds 250° C., generating the iron necessary to catalyze the reactants during the Boudouard reaction.

Since CNT growth does not initiate until the reactants reach a temperature of 500° C., there exists a temperature band between 250° C. and 500° C. referred herein as the "transition temperature range" where the $Fe(CO)_5$ decomposes without CNT growth. Free iron is unstable and tends to form compounds. Absent CNT growth at a temperature of less than 500° C., the free iron particles will bond together thereby increasing the size and mass of the iron clusters. At some point, the clusters become sufficiently large that CNT growth on the iron clusters cannot be supported. Further, the mass of the relatively large iron clusters may result in loss of the iron catalyst through precipitation of catalytic particles such as the iron clusters out of the react gas, thus resulting in decreased catalysis of the reaction. Either of these outcomes leads to fewer CNTs per batch and an increased CNT cost. Therefore, during CNT formation, reactant gases are mixed as rapidly and thoroughly as possible, leading to rapid, uniform heating of the $Fe(CO)_5$ through the transition temperature range.

In addition to chemical reactors, similar mixing problems arise often in combustion. Often, turbulence induction is employed to improve mixing typically through the use of fluid jets. Unfortunately, when applied to the HiPCO process, the eddies lead to rapid heating and cooling of the $Fe(CO)_5$ across the transition temperature range, typically multiple times, as the particles swirl through alternating regions of hot and cold gas which results in the formation of low-quality CNTs that may be adulterated with non-CNT forms of carbon.

As discussed above, the formation of quality SWCNTs in production quantities using the Boudouard reaction is difficult due, at least in part, to the critical temperatures at which the pure carbon monoxide (CO) gas stream (gas stream 1) and the iron-containing carbon monoxide gas stream (gas stream 2) must be delivered to the reactor. While formation of CNTs does not occur until the mixture of reactant gas reaches 500° C., decomposition of gas stream 2, particularly the iron component such as $Fe(CO)_5$, occurs once the iron-containing carbon monoxide is at 250° C. or above. Once decomposition of the iron component begins to occur, larger iron clusters may form which results in decreased catalysis and a resulting decrease in the quantity of SWCNTs formed. An attempt is therefore made to maintain the iron-containing reactant gas below 250° C., for example at about 200° C., prior to mixing with the pure CO gas stream. Ideally, once the two reactants are mixed, the temperature of the iron-containing component is heated from the delivery temperature to the reaction temperature of at least 500° C. as quickly as possible to reduce clustering of the iron during decomposition within the 250° C. to 500° C. transition temperature range. The pure CO reactant may be delivered to the reactor at a temperature of 1200° C. or above so that once the reactants are mixed the iron-containing reactant is heated from the delivery temperature (e.g., 200° C.) to the reaction temperature of 500° C. or above as quickly as possible.

An implementation of the present teachings provides a gas delivery system and method used to deliver and mix reactant gases within a reactor. A first reactant is maintained at a first temperature (for example, 1200° C.) and the second reactant is maintained at a second temperature that is lower than the first temperature (for example, 200° C.). The gas delivery system delivers the reactant gases at an increased surface area, thereby increasing the likelihood that the reactants will encounter each other to improve their mixing and the chemical reaction rate compared to some prior reactor mixing systems. Transfer of thermal energy from the first reactant to the second reactant may therefore be more efficient such that an entirety of the second reactant is brought to a desired reaction temperature (for example, 500° C. or above) more quickly than realized with prior gas delivery systems. As such, the reactant gases may be introduced into the reactor at reduced velocities compared to some prior systems, thereby reducing turbulence and associated negative effects on reactant mixed gas temperature.

Figure 2:
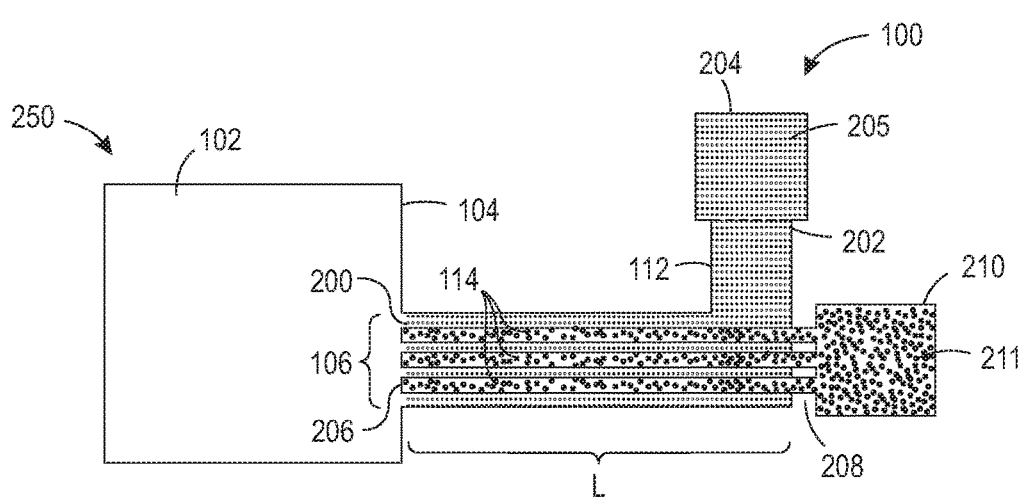
FIG. 2 is a cross section of a reactor including the gas delivery port of FIG. 1.

FIG. 1 is a schematic perspective depiction of a portion of a gas delivery system 100, and FIG. 2 is a sectional side view of the gas delivery system 100 that is part of a reactor 250 such as a High Pressure Carbon Monoxide (HiPCO) reactor, in accordance with an implementation of the present teachings. This exemplary implementation is described with reference to delivering two different gas streams into a reactor chamber 102 or other reaction vessel 102. The reactor chamber 102 may be defined by one or more reactor chamber walls 104, although other configurations are contemplated. In this implementation, the gas delivery system 100 includes a gas delivery port 106 for introducing or delivering two or more gases into the reactor chamber 102 includes a plurality of chamber gas inlets into the reactor chamber 102, including a first orifice or inlet 108 for delivering a first gas, and a plurality of second orifices or inlets 110 for delivering a second gas, into the reactor chamber 102. In this implementation, six second inlets 110 are depicted. The present teachings are discussed herein with reference to a plurality of second inlets 110, although a gas delivery port 106 may include only one second inlet 110, or two or more second inlets 110. The gas delivery port 106 may be flush with the reactor chamber wall 104 as depicted, or one or more portions of the gas delivery port 106 may extend into the reactor chamber 102.

The first inlet or orifice 108 may be disposed at a second end 200 of a first pipe, tube, line, or conduit (hereinafter, collectively "conduit") 112. A first end 202 of the first conduit 112 may be in fluid communication with, and supplied by, a first gas source 204 having a first gas 205. The plurality of second inlets 110 may each be disposed at a second end 206 of one of a plurality of second conduits 114. A first end 208 of each second conduit 114 may be in fluid communication with, and supplied by, a second gas source 210 having a second gas 211. The gas sources 204, 210 may each be one or more of a supply line, a gas storage tank, or another type of gas source.

The first conduit 112 and each of the second conduits 114 may be manufactured from a material such as stainless steel or another suitable material, or suitable combination of materials, that provide sufficient strength and rigidity and are chemically inert, or acceptably reactive with, the reactant fluids they transport.

As depicted in FIGS. 1 and 2, each second conduit 114 has a length between the first end 208 and the second end 206 of each second conduit 114. The first conduit 112 completely encircles the plurality of second conduits 114 through at least a portion "L" of the conduit lengths. The portion "L" may be positioned between the first and second gas sources 204, 210 and the gas delivery port 106 (e.g., between the first end 208 and the second end 206). As depicted in FIG. 1, each second conduit 114 may be spaced from adjacent second conduits 114 such that the first gas 205 may, in a cross section, surround each second conduit 114 as well as the second gas 211 within each second conduit 114.

Prior to delivery of the first gas 205 within the first gas source 204 and the second gas 211 within the second gas source 210, the first gas 205 and the second gas 211 may be heated or cooled to a desired temperature. For example, to form SWCNTs within the reactor chamber 102, the first gas (pure CO gas) 205 within the first gas source 204 may be heated to about 1200° C., while the second gas (CO+Fe(CO)$_5$ gas) 211 within the second gas source 210 is heated to about 200° C., or to a temperature less than the decomposition temperature of the Fe(CO)$_5$ (i.e., <250° C.). The temperatures may be selected so that once the gases 205, 211 are simultaneously delivered to the reactor chamber 102, the second gas 211 is rapidly heated through the transition temperature range of between 250° C. and 500° C. to a reaction temperature of 500° C. or above.

Figure 3:
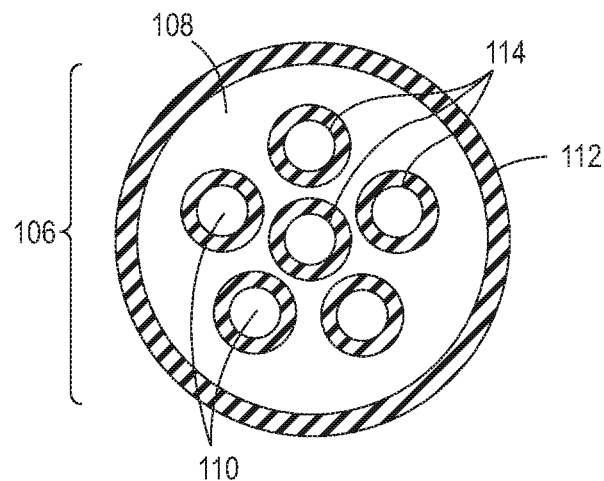
FIG. 3 is an end view of the gas delivery port of FIG. 1.
Figure 4:
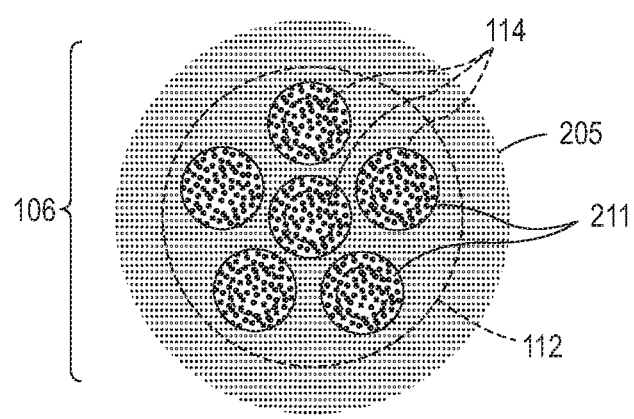
FIG. 4 depicts the gas delivery port of FIG. 3 during delivery of a first gas and a second gas.

FIG. 3 is an end view of the gas delivery port 106 including the first conduit 112 and the plurality of second conduits 114 that extend through the first conduit 112. FIG. 4 depicts the gas delivery port 106 of FIG. 3 during an initial delivery of the first gas 205 from the first orifice 108 at the second end 200 of the first conduit 112 and the second gas 211 from each second orifice 110 at the second end 206 of each of the plurality of second conduits 114. As depicted, during delivery of the gases 205, 211 from the gas delivery port 106, the stream of the first gas 205, at least in a cross section, encircles each stream of the second gas 211. This increases the area of contact between the gases 205, 211 during delivery into the reactor chamber 102 compared to a system that delivers two separate and discrete gas streams.

In an implementation to form SWCNTs, pure CO gas may be delivered into the reactor chamber 102 through the first conduit 112 at a temperature of from about 800° C. to about 1600° C., for example about 1200° C. Simultaneously, CO gas doped with a catalyst such as iron, for example, compounded in the form of Fe(CO)$_5$, may be delivered into the reactor chamber 102 through the plurality of second conduits 114 at a temperature of below 250° C., for example, from about 30° C. to about 240° C., or from about 150° C. to about 220° C., for example about 200° C. It will be understood that the "pure CO gas" may include other chemically inert materials, for example, an inert gas used to adjust the concentration of the CO gas within the first gas stream, unless otherwise specified. In an implementation, the CO portion of the second gas stream may include from about 95 percent by volume (volume %) to about 99.9 volume % CO gas and from about 0.1 volume % to about 5 volume % Fe(CO)$_5$ as a solid suspended within the CO gas.

Prior designs of HiPCO reactors to form high-quality SWCNTs have heretofore been laboratory scale. Scaling of HiPCO reactors for production quantities of SWCNTs has been limited or not possible, at least in part, because maintaining proper temperatures of reactant gases has not been possible with prior HiPCO reactor designs. Further, prior attempts at upscaling HiPCO reactor designs have not been successful, at least in part, because delivering reactant gases into a reactor chamber has been inefficient and results in poor mixing of reactant gases. For proper mixing of reactant gases to form high-quality SWCNTs using the Boudouard equation, the velocities of the two reactant gases must be properly controlled as they are delivered into the reactor chamber. Further, the two reactant gases must come into physical contact with each other quickly to allow the chemical reaction to occur at the proper temperature. An aspect of the present teachings may be used to scale up (or scale down) a HiPCO reactor to form production quantities (or sample quantities) of high-quality SWCNTs as described below.

Figure 5:
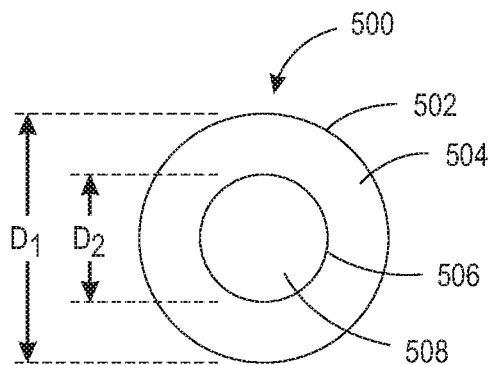
FIG. 5 is an end view of a gas delivery port in accordance with an implementation of the present teachings.

FIG. 5 depicts a fluid delivery port 500 in accordance with an implementation of the present teachings. This fluid delivery port 500 includes a first conduit 502 having a first orifice 504 for delivering the first gas stream (e.g., for delivering relatively hot, pure CO at a temperature of about 1200° C.) and only one second conduit 506 having a second orifice 508 for delivering the second gas stream (e.g., for delivering relatively cold CO+Fe catalyst at a temperature of about 200° C.). The value "$D_1$" is the diameter of the first orifice 504, while the value "$D_2$" is the diameter of the second orifice 508. For a given delivery pressure of the first gas, the value of $D_1$ will control the velocity at which the first gas is delivered into the reactor chamber through the first orifice 504. Similarly, for a given delivery pressure of the second gas, the value of $D_2$ will control the velocity at which the second gas is delivered into the reactor chamber through the second orifice 508. The ratio of $D_1/D_2$ is dependent on the mass flow rates of each inlet gas, but is selected or designed to achieve a particular ratio of the velocity of the hot gas stream (e.g., pure CO gas) to the velocity of the cold gas stream (e.g., CO mixed with the iron catalyst). In this implementation, $D_1$ and $D_2$ are selected such that a ratio of the velocity of the first gas to a velocity of the second gas (i.e., a ratio of the velocity of the hot gas stream to the cold gas stream, or "$D_1/D_2$") delivered into the reactor chamber from the respective orifices (or "$D_1/D_2$") is from about 0.1 to about 1.1, or from about 0.1 to about 1.0, or from about 0.3 to about 1.0. In another aspect, a first cross sectional area provided by the first orifice 504 and a second cross sectional area provided by the second orifice 508, for given delivery pressures of the first gas stream and the second gas stream, result in the ratio of the velocity of the first gas stream to the velocity of the second gas stream being from about 0.1 to about 1.1, or one of the other values as described above. Controlling the velocities of each of the reactant gas streams, and thus the ratio $D_1/D_2$, allows for a controlled mixing of reactant gases while reducing or eliminating turbulence and eddies. Turbulence and eddies, as described above, can result in rapid heating and cooling of the iron-containing gas stream(s) and, in turn, form low-quality CNTs that may be adulterated with non-CNT forms of carbon.

The value of $D_1/D_2$, where $D_1$ is the velocity of the first gas stream (pure CO) and $D_2$ is the velocity of the second gas stream (CO+Fe catalyst, for example, $Fe(CO)_5$), is referred to herein as the "gas velocity ratio." Further, the depiction of FIG. 5 is a particular gas flow path described herein as a "unit cell" as it includes only one second orifice 508 (or second diameter $D_2$) for the for each diameter $D_1$. While diameter $D_1$ of FIG. 5 is provided by an actual structure (i.e., the first conduit 502), $D_1$ may also be a theoretical distance or spacing used to design a reactor that is scaled up (or scaled down) to have an increased (or decreased) SWCNT output.

Figure 6:
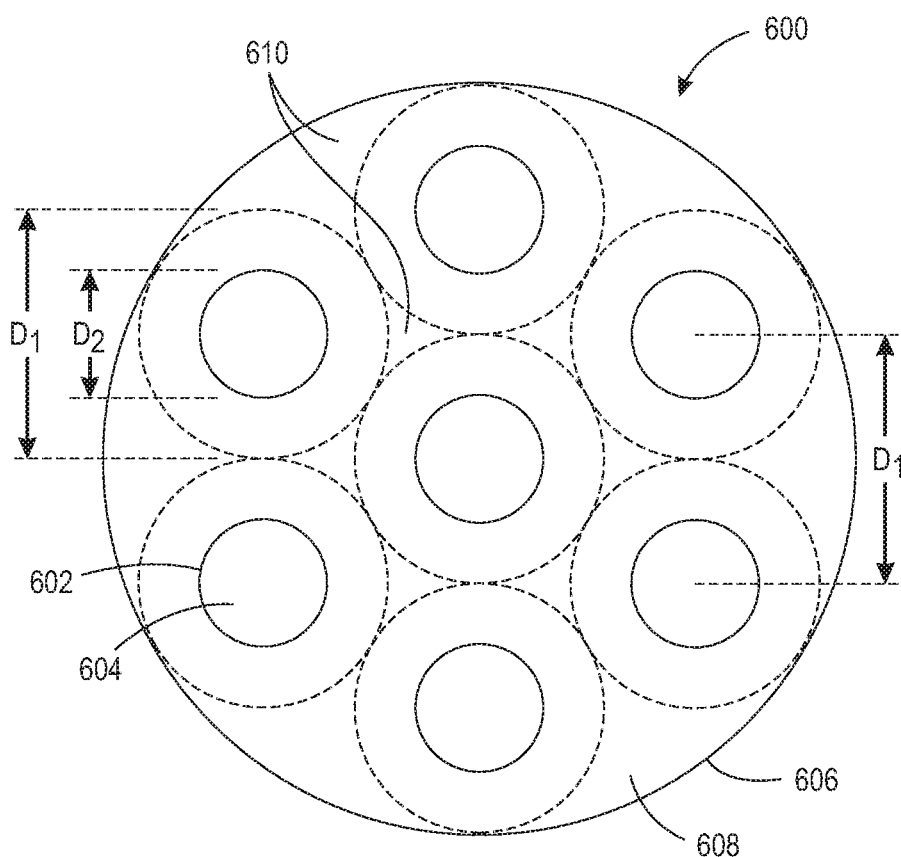
FIG. 6 is an end view of a gas delivery port in accordance with an implementation of the present teachings.

The principle of the gas velocity ratio and the unit cell may be used to design a HiPCO reactor having a desired output of high-quality SWCNTs. In particular, the HiPCO reactor may be scaled up and designed for large quantities (i.e., production quantities) of SWCNTs. In contrast to the fluid delivery port 500 of FIG. 5 that includes a single second conduit 506 and a single second orifice 508 for delivering the second gas stream (i.e., a single unit cell), FIG. 6, for purposes of explanation, depicts a fluid delivery port 600 having seven second conduits 602 and thus seven second orifices 604 (i.e., seven unit cells) that deliver the second gas into a reactor chamber. A fluid delivery port may include any number of second conduits and second orifices, for example, from one to 10, or more than 10. FIG. 6 further depicts a first conduit 606 having a first orifice 608 that delivers the first gas into the reactor chamber, wherein each of the second conduits 602 are positioned within the interior of the first conduit 606. In this implementation, the boundary of the flow path of the first gas defined within each iteration of $D_1$ is a theoretical boundary. While the actual sizes of $D_1$ and $D_2$ may change, the sizes of $D_1$ and $D_2$ are selected to maintain the gas velocity ratio described above. In theory, the diameter of the first conduit 606 and the plurality of second conduits 602 may be any size, as long as the size of the unit cell results in the gas velocity ratio within the selected ranges described above. Typically, the dimension $D_2$ of the second conduits 602 may be in the range of 1 millimeter (mm) to 20 mm. It will be appreciated that only certain combinations of $D_1$ and $D_2$ dimensions maintain the gas velocity ratio and result in sufficient reactant gas mixing. The overall reactor size and the arrangement pattern of unit cell flow paths simplifies down to a two dimensional packing calculation, and may be determined by one of ordinary skill in the art.

As depicted in FIG. 6 each of the unit cells including $D_1$ and $D_2$ fit within the circumference of the first conduit 606. In FIG. 6, there is no overlap between adjacent unit cells. $D_1$ of each unit cell is tangent with $D_1$ of two or more adjacent unit cells. Each unit cell at a periphery of the fluid delivery port 600 is tangent with the first conduit 606.

Thus, in contrast to prior fluid delivery port and reactor designs, the present teachings allow scalability of the reactor provided the reactor is designed such that the ratio of $D_1/D_2$ provides the described gas velocity ratio. This scalability of a reactor according to the present teachings, particular up scaling to increase throughput, increases production and drives down the cost of materials.

Figure 7:
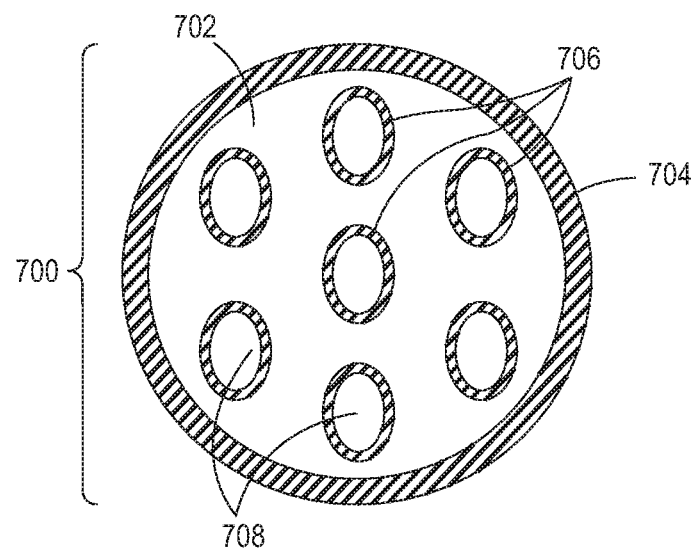
FIG. 7 is an end view of a gas delivery port in accordance with an implementation of the present teachings.

The shapes of the first orifice 108 of the first conduit 112 the plurality of second orifices 110 of the plurality of second conduits 114 may have a circular shape as depicted in FIG. 3. In some uses, other shapes may be used to tailor the fluid dynamics of each gas stream as it is delivered into the reactor chamber 102 for a particular use. For example, FIG. 7 depicts a gas delivery port 700 where a first orifice 702 formed by a second end of a first conduit 704 has a circular shape, where a second end of each of a plurality of second conduits 706 forms an oval-shaped orifice 708. Oval-shaped orifices 708 may function differently from the circular orifices 110 of FIG. 3 in that the flow patterns may result in increased entrainment, and therefore improved fluid mixing, without significant recirculation patterns present in traditional turbulent mixing apparatuses. These features, combined with the resulting increased surface areas, may reduce temperature non-uniformity and contribute to increased catalyst dispersion.

Figure 8:
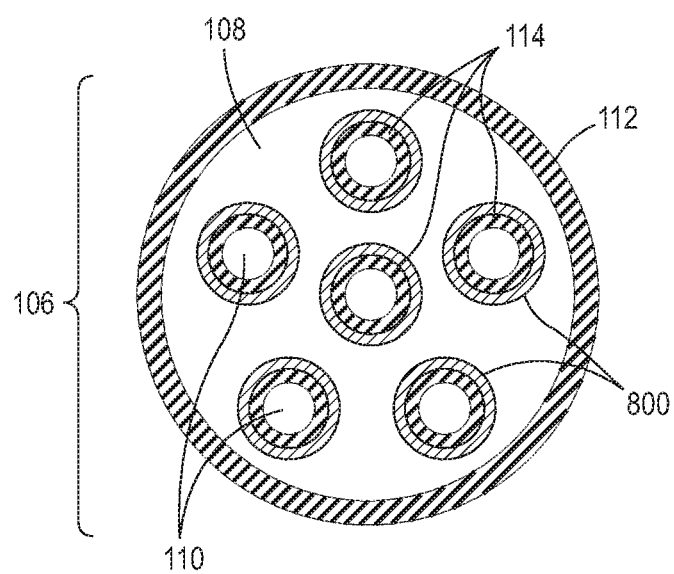
FIG. 8 is an end view of a gas delivery port in accordance with an implementation of the present teachings.

As discussed above, in an implementation, it may be advantageous or necessary for a given chemical reaction to maintain the gas in the plurality of second conduits at a different temperature from the gas in the first conduit until the uses are introduced into the reactor chamber 102. FIG. 8 depicts a structure similar to that of FIG. 3, and further including one or more thermal control devices 800 configured to maintain thermal separation of the gases during transport from the gas sources 204, 210 (FIG. 2) to the reactor chamber 102. The thermal control device 800 may be a passive thermal control device, for example, a thermal insulation, such as a natural or synthetic insulation, that encases each of the plurality of second conduits 114. In another implementation, the thermal control device 800 may be an active thermal control device, for example, a thermal coil such as a heating coil or a cooling coil that is wrapped or otherwise disposed on, around, or near each of the plurality of second conduits 114. In another aspect, the thermal control device 800 may include both a thermal insulation and a thermal coil. The thermal control device 800 may be positioned between the exterior of each second conduit 114 and the first gas within the first conduit 112. In another aspect, the thermal control device 800 may be positioned between the first gas 205 within the first conduit 112 and the second gas 211 within the plurality of second conduits 114.

Figure 9:
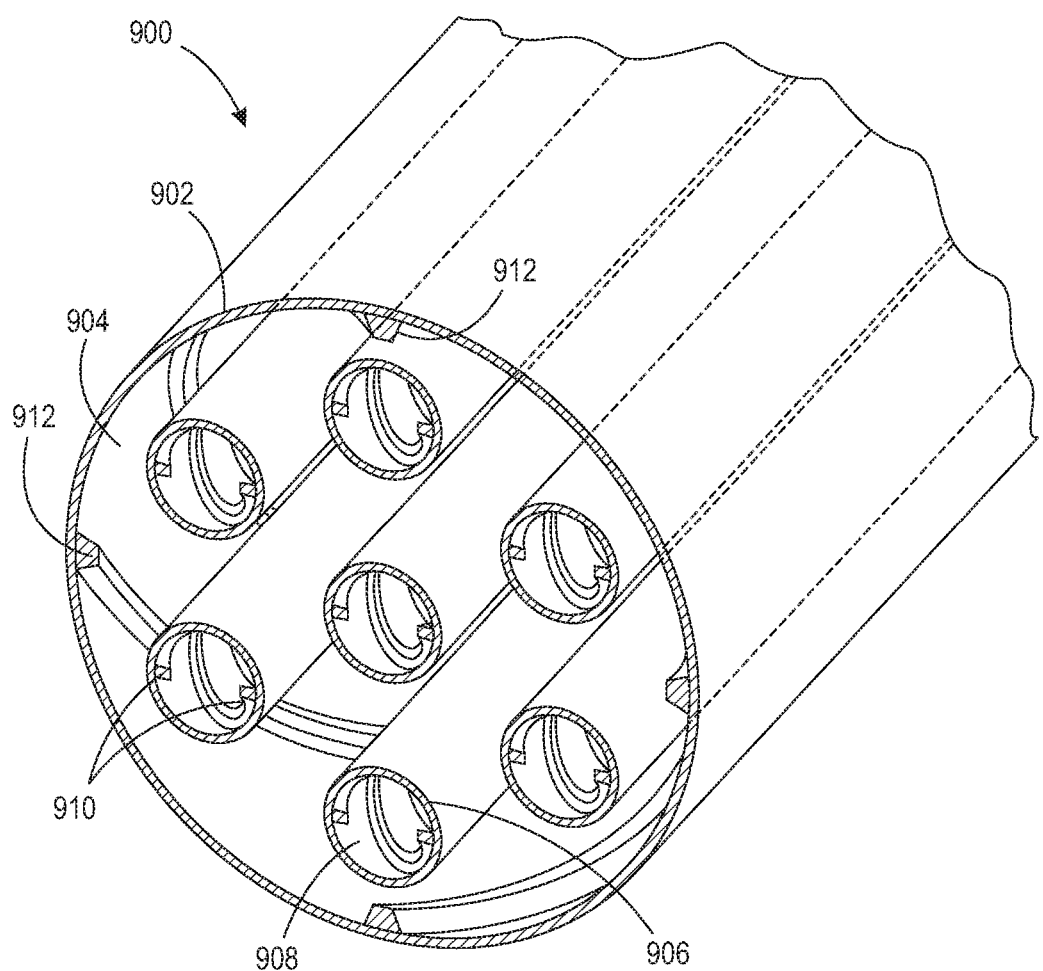
FIG. 9 is a perspective depiction of a gas delivery port for delivering gases into a reaction vessel.

In various implementations such as those depicted in FIGS. 1 and 2, the interior surfaces of the first conduit 112 and/or the one or more second conduits 114 may be smooth. In various other implementations such as that depicted in FIG. 9, a gas delivery port 900 may be configured to customize fluid flow dynamics of the gases as they are introduced into the reactor chamber 102 (FIG. 1), such that either or both the first gas 205 and the second gas 211 exit the fluid delivery port 900 with a gentle swirling motion that enhances the mixing of the reactant gases to increase the reactions occurring between molecules of the reactant gases. The gas delivery port 900 of FIG. 9 depicts a first conduit 902 having a first orifice 904 and a plurality of second conduits 906 each having a second orifice 908. The plurality of second conduits 906 are positioned within an interior of the first conduit 902.

In FIG. 9, the second conduits 906 may include one or more threads, channels, or rifling 910 (hereinafter, threads), or combinations thereof, that extend through at least an end of the second conduits 906 to impart a directionality to the second gas as it exits the fluid delivery port 900. In an implementation, the threads 910 may extend through an entirety of the length "L" (FIG. 2) of the second conduits 906. In another implementation, the threads 910 may be formed only at the second end 206 (FIG. 2) of the second conduits 906. The threads 910 are formed with a length sufficient to impart a gentle swirling motion to the second gas as it exits each second orifice 908. The threads 910 of each second conduit 906 may be formed to impart one of a clockwise swirling motion or a counterclockwise swirling motion of the second gas as it exits each second orifice 908.

In an implementation, the threads 910 of one or more of the second conduits 906 may be formed to impart a clockwise swirling motion of the second gas, while the threads 910 of one or more of the second conduits 906 may be formed to impart a counterclockwise swirling motion to the second gas. In an implementation, one or more of the second conduits 906 may include threads 910, while one or more second conduits 906 may not include threads. The threads 910 may be formed as raised threads that protrude from internal sidewalls of the second conduit 906 into an interior of the second conduit 906, or they may be formed as channels that extend into the internal sidewalls of the second conduit 906.

In FIG. 9, the first conduit 902 may also include one or more channels, threads, or rifling 912 (hereinafter, threads 912), or combinations thereof, that extend through at least an end of the first conduit 902 to impart a directionality to the first gas as it exits the fluid delivery port 900. In an implementation, the threads 912 may extend through an entirety of the length "L" (FIG. 2) of the first conduits 902. In another implementation, the threads 912 may be formed only at the second end 200 (FIG. 2) of the first conduits 902. The threads 912 are formed with a length sufficient to impart a gentle swirling motion to the first gas as it exits the first orifice 904. The threads 912 of the first conduit 902 may be formed to impart one of a clockwise swirling motion or a counterclockwise swirling motion to the first gas as it exits the first orifice 904. The threads 912 may be formed as raised threads that protrude from internal sidewalls of the first conduit 902 into an interior of the first conduit 902, or they may be formed as channels that extend into the internal sidewalls of the first conduit 902. The threads 912 of the first conduit 902 may be referred to as "first threads" while the threads 910 of the second conduits 906 may be referred to as "second threads."

As described above, the optional first threads 912 and the optional second threads 910 may be used to impart a clockwise and/or counterclockwise gentle swirling motion to the first gas 205 and/or the second gas 211 respectively, thereby imparting a vortex, current, or directionality to the first gas 205 and/or the second gas 211 respectively. The directionality of the first threads 912 of one or more of the second conduits 906 may be the same or different than the directionality of the second threads 910 of the first conduit 902. The directionality may improve physical contact or reaction of the first gas 205 with the second gas 211.

Figure 10:
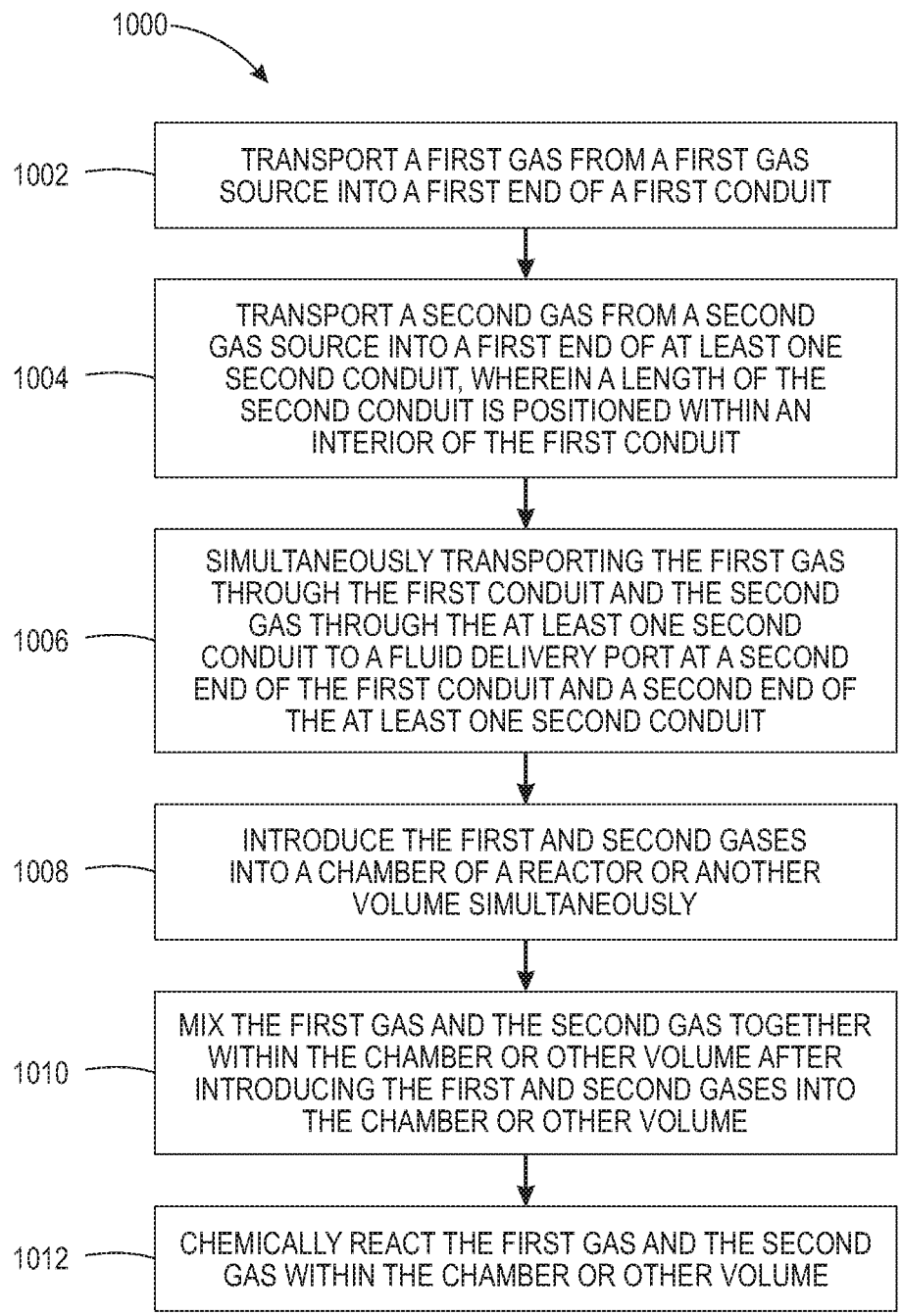
FIG. 10 is a flow chart of a method in accordance with an implementation of the present teachings.

FIG. 10 is a flow chart depicting a method in accordance with an implementation of the present teachings. For purposes of explanation, the method of FIG. 10 is described with reference to FIGS. 1-6, although other structures for performing the method of FIG. 10 are contemplated. As described at 1002, a first gas 205 may be transported from a first gas source 204 into a first end 202 of a first conduit 112. At 1004, a second gas 211 from a second gas source 210 may be transported into a first end 208 of at least one second conduit 114. A length "L" of the second conduit 114, which may be a portion of an entire length of the second conduit 114, is positioned within an interior of the first conduit 112. Through length L, the at least one second conduit 114 may be freestanding and free from physical contact with the first conduit 112 as depicted, for example, at FIG. 2.

At 1006 the first gas 205 may be transported through the first conduit 112 while the second gas 211 is simultaneously transported through the at least one second conduit 114 to a gas delivery port 106 at a second end 200 of the first conduit 112 and a second end 206 of the at least one second conduit 114. Next, with reference to 1008, the first gas 205 and the second gas 211 may be simultaneously introduced into a reactor chamber 102 of a reactor 250 or another volume through the gas delivery port 106.

In an implementation using the Boudouard reaction, the gases may be introduced at a relatively low pressure compared to conventional methods of formation. As discussed above, introducing the reactants into the reactor chamber at a reduced pressure may be advantageous because high turbulence, when applied to a HiPCO process, creates eddies that may lead to rapid heating and cooling of the $Fe(CO)_5$ across the transition temperature range, typically multiple times, as the particles swirl through alternating regions of hot and cold gas. This, in turn, may result in the formation of low-quality SWCNTs that may be adulterated with non-CNT forms of carbon.

As the first gas 205 and the second gas 211 are introduced into the reactor chamber 102, they are mixed as described at 910. As the first gas 205 and the second gas 211 mix, they may chemically react within the reactor chamber 102 or other reaction vessel or volume as described at 912. Additional processing of the reactant resulting from the mixing of the first gas 205 and the second gas 211 may continue.

FIGS. 1-9 depict a single gas delivery port that introduces gases into a volume such as a chamber 102 of a reactor 250. It will be appreciated that a plurality of gas delivery ports may be employed to simultaneously introduce gases into a volume such as a reactor chamber 102 at a plurality of different locations within the volume.

In an implementation, size, capacity, and/or throughput of the first conduit and the plurality of second conduits may be based, at least in part, on the stoichiometry of the chemical equation that is being used with the gas delivery system. In the Boudouard equation above, one mole of pure CO gas is needed for every mole of CO gas doped with iron. In the FIG. 3 depiction, the pure CO gas may be delivered through the first inlet 108 while the iron-doped CO gas may be delivered through the plurality of second inlets 110. In this implementation, a cross sectional area of the first inlet 108 may be equal to, or approximately equal to, the sum of the cross sectional areas of each of the plurality of second inlets 110. The cross sectional areas may vary with other factors independent of the stoichiometry, for example, if one of the reactants is mixed with an inert diluent.

Thus an implementation of the present teachings may be used to provide for an improved chemical reaction by allowing for improved mixing of reactants. In an implementation, a larger surface area of the reactants come in contact to provide for improved mixing. The plurality of second conduits that deliver a plurality of smaller gas streams within a larger gas stream provides a laminar flow of gases into a volume such as a reactor chamber. Introduction of gases into the volume at a lower pressure may allow for decreased turbulence and an improved temperature profile of the reagents during formation of a product. In the example of the Boudouard reaction, improved mixing may yield a higher quantity and/or weight of SWCNTs for a given molar quantity of reactants. A manufacturing system and process that uses an implementation of the present teachings may be more suitable for producing production quantities of SWCNTs than prior systems and methods of formation.

It will be appreciated that a system and method in accordance with an implementation of the present teachings may include structures or method acts that, for simplicity, have not been depicted in the figures, and that various depicted structures or method acts may be removed or modified.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A system for forming carbon nanotubes, the system comprising:
   a first conduit configured to introduce a carbon monoxide gas into a reaction vessel; and
   a plurality of second conduits configured to introduce catalytic particles into the reaction vessel, wherein:
   each second conduit of the plurality of second conduits comprises a length;
   at least a portion of the length of each second conduit is disposed entirely within the first conduit;
   each second conduit of the plurality of second conduits is spaced from each adjacent second conduit over the portion of the length; and
   each second conduit of the plurality of second conduits is free from physical contact with the first conduit over the portion of the length.

2. The system of claim 1, further comprising a thermal control device configured to maintain a thermal separation between the first conduit and the plurality of second conduits, wherein the thermal control device comprises at least one of a thermal insulation and a thermal coil.

3. The system of claim 1, further comprising at least one thread, channel, or rifling, or combinations thereof, in at least one of an interior of the first conduit and an interior of at least one of the second conduits, wherein the at least one thread, channel, or rifling is configured to impart a swirling motion to at least one of a carbon monoxide gas as it exits the first conduit into the reaction vessel and catalytic particles as they exit the at least one second conduit into the reaction vessel.

4. The system of claim 1, wherein:
   the first conduit comprises a first end attached to a carbon monoxide gas source and a second end that delivers a carbon monoxide gas from the carbon monoxide gas source through the first conduit and into the reaction vessel;
   the second end of the first conduit has a first diameter that delivers the carbon monoxide gas into the reaction vessel at a first velocity;
   each second conduit of the plurality of second conduits comprises a first end attached to a catalytic particle source and a second end that delivers catalytic particles from the catalytic particle source into the reaction vessel;
   the second end of each of the plurality of second conduits comprises a second diameter that delivers the catalytic particles into the reaction vessel at a second velocity; and
   a ratio of the first velocity to the second velocity is from 0.1 to 1.1.

5. The system of claim 3, wherein the at least one thread, channel, or rifling, or combinations thereof, is positioned within the interior of the first conduit.

6. The system of claim 3, wherein the at least one thread, channel, or rifling, or combinations thereof, is positioned within the interior of the at least one second conduit.

7. The system of claim 3, wherein the at least one thread, channel, or rifling, or combinations thereof, comprises:
a first thread, channel, or rifling, or combinations thereof, positioned within the interior of the first conduit; and
a second thread, channel, or rifling, or combinations thereof, positioned within the interior of the at least one second conduit.

8. The system of claim 1, further comprising:
a carbon monoxide gas source in fluid communication with the first conduit, wherein the carbon monoxide gas source comprises a carbon monoxide gas; and
a catalytic particle source in fluid communication with the plurality of second conduits, wherein the catalytic particle source comprises carbon monoxide particles doped with a catalyst.

9. A system for forming carbon nanotubes, the system comprising:
a first conduit configured to introduce carbon monoxide gas into a reaction vessel;
a second conduit configured to introduce catalytic particles into the reaction vessel, wherein the second conduit comprises a length, and at least a portion of the length is disposed entirely within the first conduit; and
at least one thread, channel, or rifling, or combinations thereof, in at least one of an interior of the first conduit and an interior of the second conduit, wherein the at least one thread, channel, or rifling is configured to impart a swirling motion to at least one of a carbon monoxide gas as it exits the first conduit into the reaction vessel and catalytic particles as they exit the second conduit into the reaction vessel.

10. The system of claim 9, further comprising a plurality of second conduits configured to introduce the catalytic particles into the reaction vessel, wherein each second conduit of the plurality of second conduits comprises a length, and at least a portion of the length of each of the plurality of second conduits is disposed entirely within the first conduit.

11. The system of claim 10, further comprising a thermal control device configured to maintain a thermal separation between the first conduit and the plurality of second conduits, wherein the thermal control device comprises at least one of a thermal insulation and a thermal coil.

12. The system of claim 10 further comprising a plurality of second conduits, wherein:
the first conduit comprises a first end attached to a carbon monoxide gas source and a second end that delivers a carbon monoxide gas from the carbon monoxide gas source through the first conduit and into the reaction vessel;
the second end of the first conduit has a first diameter that delivers the carbon monoxide gas into the reaction vessel at a first velocity;
each second conduit of the plurality of second conduits comprises a first end attached to a catalytic particle source and a second end that delivers catalytic particles from the catalytic particle source into the reaction vessel;
the second end of each of the plurality of second conduits comprises a second diameter that delivers the catalytic particles into the reaction vessel at a second velocity; and
a ratio of the first velocity to the second velocity is from 0.1 to 1.1.

13. The system of claim 9, wherein:
the first conduit comprises a first end attached to a carbon monoxide gas source and a second end that delivers a carbon monoxide gas from the carbon monoxide gas source through the first conduit and into the reaction vessel;
the second end of the first conduit has a first diameter that delivers the carbon monoxide gas into the reaction vessel at a first velocity;
the second conduit comprises a first end attached to a catalytic particle source and a second end that delivers catalytic particles from the catalytic particle source into the reaction vessel;
the second end of the second conduit comprises a second diameter that delivers the catalytic particles into the reaction vessel at a second velocity; and
a ratio of the first velocity to the second velocity is from 0.1 to 1.1.

14. A system for forming carbon nanotubes, the system comprising:
a reaction vessel;
a first conduit and a carbon monoxide gas within an interior of the first conduit, wherein:
the first conduit opens into the reaction vessel at a gas delivery port and the first conduit is configured to introduce the carbon monoxide gas into the reaction vessel;
a second conduit and a plurality of catalytic particles within an interior of the second conduit, wherein:
the second conduit comprises a length;
at least a portion of the length of the second conduit is disposed entirely within the first conduit;
the second conduit opens into the reaction vessel at the gas delivery port; and
the second conduit is configured to introduce the plurality of catalytic particles into the reaction vessel; and
at least one thread, channel, or rifling, or combinations thereof, in at least one of the interior of the first conduit and the interior of the second conduit, wherein the at least one thread, channel, or rifling is configured to impart a swirling motion to at least one of a carbon monoxide gas as it exits the first conduit into the reaction vessel and the plurality of catalytic particles as they exit the second conduit into the reaction vessel.

15. The system of claim 14, further comprising a plurality of second conduits configured to introduce the plurality catalytic particles into the reaction vessel, wherein:
the plurality of catalytic particles are positioned within the plurality of second conduits;
each second conduit of the plurality of second conduits comprises a length;
at least a portion of the length of each of the plurality of second conduits is disposed entirely within the first conduit; and
each second conduit of the plurality of second conduits opens into the reaction vessel.

16. The system of claim 14, wherein:
the carbon monoxide gas within the interior of the first conduit at the gas delivery port has a temperature of from 800° C. to 1600° C.; and
the plurality of catalytic particles within the interior of the second conduit at the gas delivery port has a temperature of below 250° C.

17. The system of claim 14, further comprising a thermal control device configured to maintain a thermal separation between the carbon monoxide within the interior of the first conduit and the plurality of catalytic particles within the interior of the second conduit, wherein the thermal control device comprises at least one of a thermal insulation and a thermal coil.

18. The system of claim 17, wherein the thermal control device comprises thermal insulation.

19. The system of claim 17, wherein the thermal control device is a thermal coil.

20. The system of claim 17, further comprising a carbon monoxide gas doped with the plurality of catalytic particles, wherein the plurality of catalytic particles comprise iron.

* * * * *